(12) United States Patent
Scott

(10) Patent No.: US 6,252,011 B1
(45) Date of Patent: Jun. 26, 2001

(54) BLENDS OF POLYETHERIMIDES WITH POLYESTERS OF 2,6-NAPHTHALENEDICARBOXYLIC ACID

(75) Inventor: Christopher E. Scott, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 08/251,148

(22) Filed: May 31, 1994

(51) Int. Cl.$^7$ ........................................ C08L 79/08
(52) U.S. Cl. ................................ 525/425; 525/436
(58) Field of Search ................................ 525/425

(56) References Cited

U.S. PATENT DOCUMENTS

| | | | |
|---|---|---|---|
| 3,847,867 | 11/1974 | Heath et al. | 528/26 |
| 3,847,869 | 11/1974 | Williams | 528/170 |
| 3,850,885 | 11/1974 | Takekoshi et al. | 528/170 |
| 3,852,242 | 12/1974 | White | 528/170 |
| 3,855,178 | 12/1974 | White et al. | 524/392 |
| 3,887,588 | 6/1975 | Cook et al. | 549/243 |
| 4,017,511 | 4/1977 | Williams, III | 528/170 |
| 4,024,110 | 5/1977 | Takekoshi | 528/170 |
| 4,141,927 | 2/1979 | White et al. | 525/425 |
| 4,250,279 | 2/1981 | Robeson et al. | 525/425 |
| 4,687,819 | 8/1987 | Quinn et al. | 525/425 |
| 4,835,047 | * 5/1989 | Isayer et al. | 420/294 |
| 4,908,418 | 3/1990 | Holub | 525/425 |
| 4,908,419 | 3/1990 | Holub et al. | 525/425 |
| 5,284,903 | * 2/1994 | Minnick | 524/538 |
| 5,306,785 | * 4/1994 | Borman et al. | 525/425 |

OTHER PUBLICATIONS

M. M. Coleman, C. J. Serman, D. E. Bhagwagar, P. C. Painter, *Polymer*, 31, 1187 (1990).

\* cited by examiner

*Primary Examiner*—Ana Woodward
(74) *Attorney, Agent, or Firm*—Karen A. Harding; Betty J. Boshears; Harry J. Gwinnell

(57) ABSTRACT

This invention relates to a visually clear blend of thermoplastic polymers comprising a polyetherimide and a polyester of (a) an acid component comprising 2,6-naphthalene dicarboxylic acid and (b) a glycol component comprising at least one glycol selected from the group consisting of ethylene glycol, 1,3-trimethylene glycol, 1,4-butanediol, 1,5-pentanediol, 1,6-hexanediol, 1,7-heptanediol, neopentyl glycol, 1,4-cyclohexanedimethanol and diethylene glycol.

20 Claims, 1 Drawing Sheet

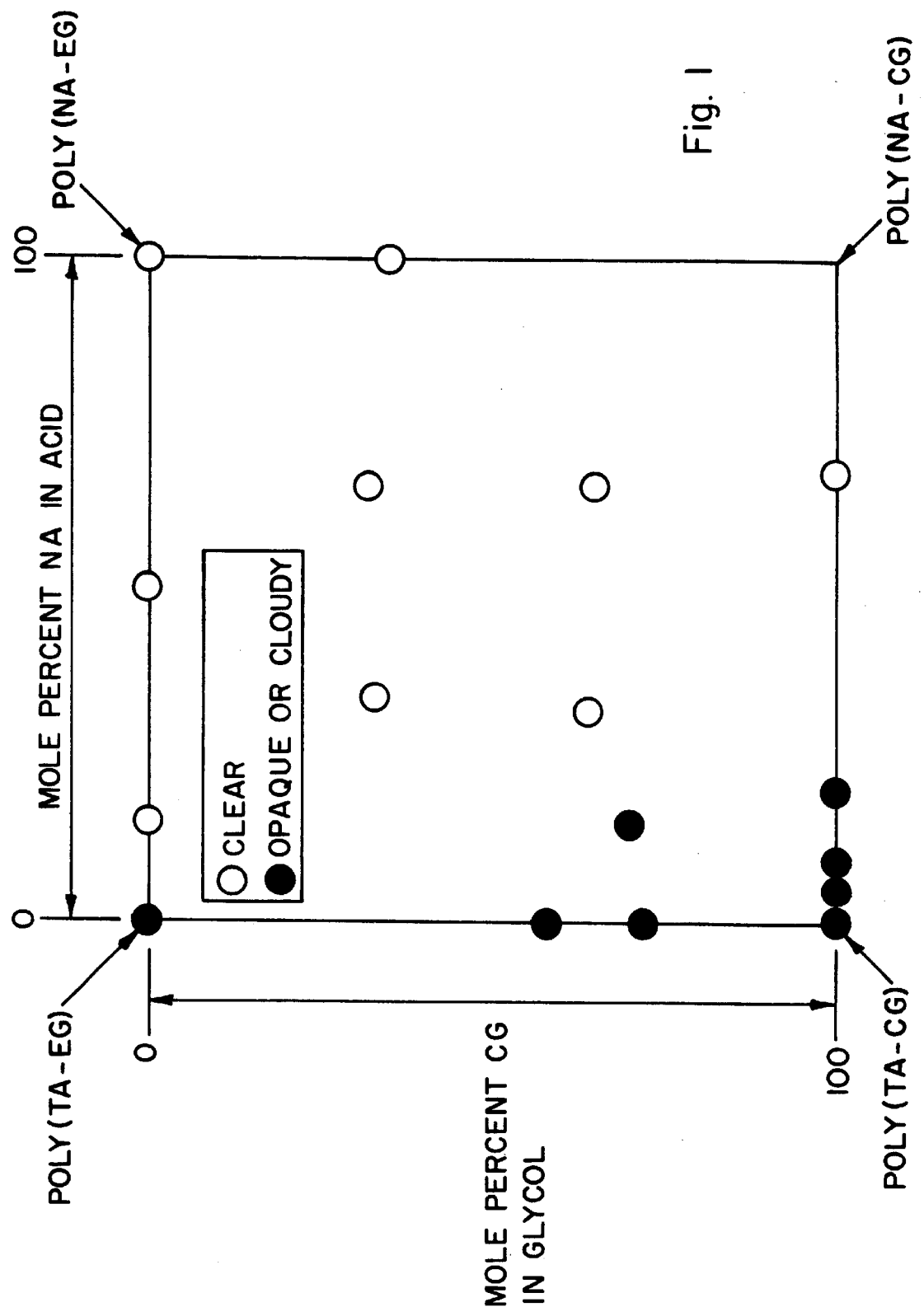

BLENDS OF POLYETHERIMIDES WITH POLYESTERS OF 2,6-NAPHTHALENEDICARBOXYLIC ACID

FIELD OF THE INVENTION

This invention relates to polymer blends and, more particularly, to a blend of thermoplastic polymers which form a single phase solid solution of excellent optical clarity and good flexural properties.

BACKGROUND OF THE INVENTION

Thermoplastic polymers useful for injection molding and extrusion to form molded articles and films often are deficient in one or more properties. Efforts to modify the properties of a polymer that is otherwise suitable, for example, by blending it with another polymer usually produce an opaque or cloudy blend which is not acceptable when the molded article or film must be clear and transparent. For example, U.S. Pat. No. 4,141,927 to White et al. discloses blends of polyetherimides and of polyesters based primarily on terephthalic acid and isophthalic acid. The patent discloses blends which formed multiple phase solid state solutions in the composition range from about 25 to 90 weight percent polyester. Such compositions are understood to be opaque and cloudy. Blends of polyarylates with polyetherimide are disclosed in the U.S. Pat. No. 4,250,279 to Robeson et al., and U.S. Pat. No. 4,908,419 to Holub et al. Three components blends of polyetherimide, polyester and a third polymer are also disclosed in U.S. Pat. No. 4,687,819 to Quinn et al. and U.S. Pat. No. 4,908,418 to Holub. None of these patents suggests a polymer composition having the combination of desired flexural properties, clarity and transparency.

There is a continuing need for thermoplastic polymer compositions that have high flexural moduli, high flexural strength and high heat deflection temperatures and that can be injection molded or extruded to form articles of excellent clarity and transparency.

BRIEF SUMMARY OF THE INVENTION

The composition of the invention is a visually clear blend of thermoplastic polymers comprising (A) a polyetherimide which is described in more detail hereinafter and (B) a polyester of a dicarboxylic acid component comprising 2,6-naphthalene dicarboxylic acid and a glycol component comprising at least one aliphatic or cycloaliphatic glycol selected from the group consisting of ethylene glycol, 1,3-trimethylene glycol, 1,4-butanediol, 1,5-pentanediol, 1,6-hexanediol, 1,7-heptanediol, neopentyl glycol, 1,4-cyclohexanedimethanol and diethylene glycol.

The invention also includes molded articles and films formed of the novel polymer blend. In addition, the invention includes a method for improving the physical properties of a polymer composition comprising a polyester of 2,6-naphthalene dicarboxylic acid that comprises melt blending or solution blending with the polyester a polyetherimide of the type described herein to form a single phase solid solution which is clear and transparent and of higher flexural modulus than the polyester.

BRIEF DESCRIPTION OF THE DRAWINGS

The sole FIGURE of the drawings is a plot of polymer compositional ranges for certain clear and cloudy polymer blends.

DETAILED DESCRIPTION OF THE INVENTION

As used herein, the term "polyester" means a polyester of a single dicarboxylic acid and a single glycol or a co-polyester of one or more dicarboxylic acids and one or more glycols. The term "dicarboxylic acid component" means the acid or mixture of acids (or their equivalent esters, anhydrides or halides) which react with a glycol or glycols to form a polyester. Similarly, the term "glycol component" means the glycol or glycols which react with such acid or acids (or their equivalent esters, anhydrides or halides) to form a polyester.

The novel polyetherimide/polyester blends of the invention comprise about 1% to 99% of a polyetherimide of the formula:

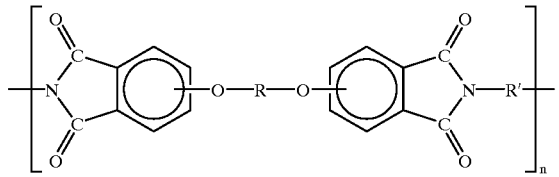

where n represents a whole number in excess of 1, for example 10 to 10,000 or more. The radical —O—R—O— is in the 3- or 4- and 3'- or 4'-positions.

The radical —R— is a member of the class consisting of:

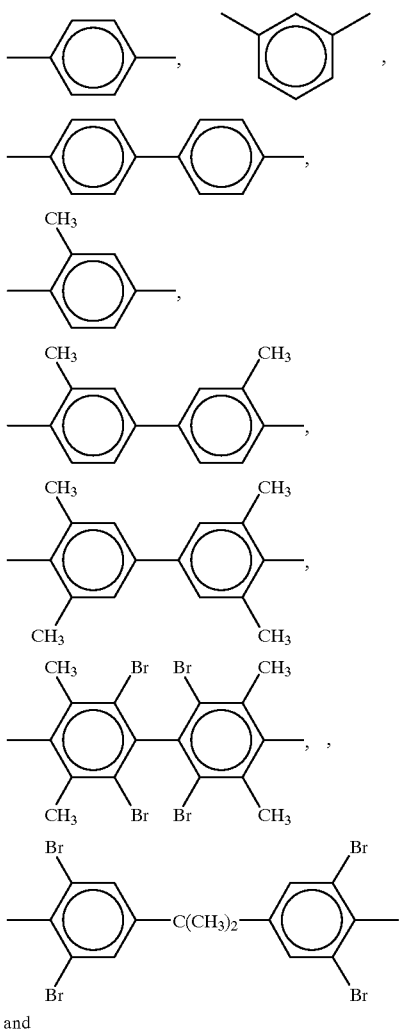

and

-continued

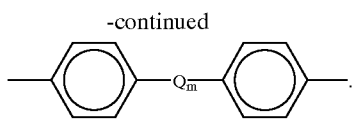

where m is 0 or 1 and Q is

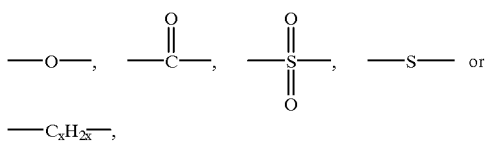

and x is a whole number from 1 to 5, inclusive.

The radical —R'— is a divalent organic radical selected from the class consisting
(1) aromatic hydrocarbon radicals having from 6 to 20 carbon atoms and halogenated derivatives thereof;
(2) alkylene radicals and cycloalkylene radicals having from 2 to 20 carbon atoms; and
(3) radicals of the formula:

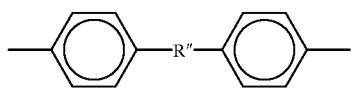

where R" is:

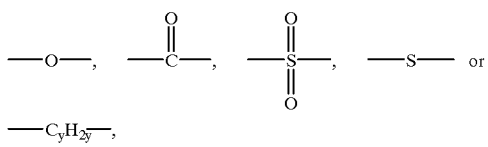

and y is a whole number from 1 to 5, inclusive.

Such polyetherimides can be formed, for example, by the reaction of an aromatic bis(ether anhydride) of the formula:

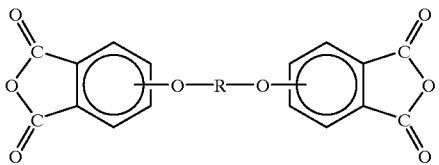

with a diamino compound of the formula:

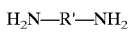

Included among the methods of making the polyetherimide are those disclosed in U.S. Pat. Nos. 3,847,867; 3,847,869; 3,850,885; 3,852,242; 3,855,178; 3,887,588; 4,017,511; and 4,024,110. These disclosures are incorporated herein by reference.

The novel polyester/polyetherimide blends of the invention also comprise about 99% to 1% of a polyester of 2,6-naphthalenedicarboxylic acid and of one or a mixture of two or more of the following aliphatic and cycloaliphatic glycols:
  ethylene glycol
  1,3-trimethylene glycol
  1,4-butanediol
  1,5-pentanediol
  1,6-hexanediol
  1,7-heptanediol
  neopentyl glycol
  1,4-cyclohexanedimethanol (cis and trans isomers and mixtures thereof)
  diethylene glycol In addition, the polyester or copolyester may be modified by other acids or a mixture of acids including, but not limited to:
  terephthalic acid
  isophthalic acid
  phthalic acid
  4,4'-stilbenedicarboxylic acid
  oxalic acid
  malonic acid
  succinic acid
  glutaric acid
  adipic acid
  pimelic acid
  suberic acid
  azelaic acid
  sebacic acid
  1,12-dodecanedioic acid
  dimethylmalonic acid
  cis-1,4-cyclohexanedicarboxylic acid
  trans-1,4-cyclohexanedicarboxylic acid The glycols or mixture of glycols may also be modified by other glycols or a mixture of glycols including, but not limited to:
  1,8-octanediol
  1,9-nonanediol
  1,10-decanediol
  1,12-dodecanediol
  2,2,4,4-tetramethyl-1,3-cyclobutanediol The amount of modifying acid or glycol (preferably less than 10 mole percent) which may be incorporated in the polyester while still achieving a clear, single phase blend depends on the particular acids and glycols which are used. Although it is not intended for this invention to be limited by any particular theory, the polyester and copolyester compositions which will produce single phase, clear materials can generally be determined by the method of Coleman, et al. [M. M. Coleman, C. J. Serman, D. E. Bhagwagar, P. C. Painter, Polymer, 31, 1187 (1990).] for prediction of polymer-polymer miscibility. Polyesters of 1,6-naphthalene dicarboxylic acid having solubility parameters between about 10.85 $(cal \cdot cm^{-3})^{0.5}$ and about 15.65 $(cal \cdot cm^{-3})^{0.5}$ as calculated by the method of Coleman et al. in general form single phase, clear blends.

Polyetherimides of the invention which are preferred are those in which:

R is 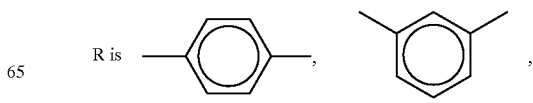

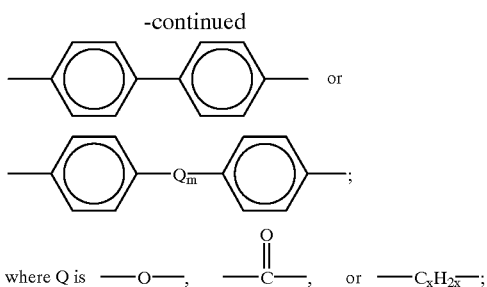

where Q is —O—, —C(=O)—, or —C$_x$H$_{2x}$—;

R' is an aromatic hydrocarbon radical having from 6 to 10 carbon atoms, or an alkylene or cycloalkylene radical having from 2 to 10 carbon atoms; or where

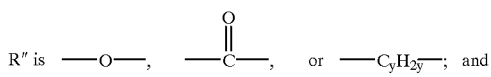

R" is —O—, —C(=O)—, or —C$_y$H$_{2y}$—; and m, x and y are as defined above.

Polyetherimides of the invention which are even more preferred are those in which:

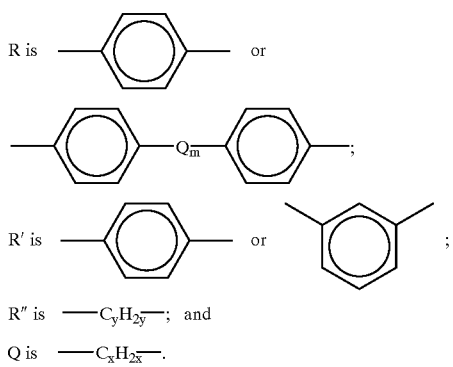

R" is —C$_y$H$_{2y}$—; and
Q is —C$_x$H$_{2x}$—.

Polyetherimides of the invention which are even more preferred are those in which

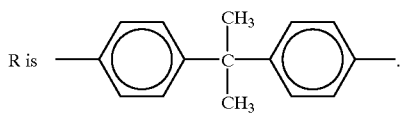

Preferred blends of polyetherimides and polyesters of the invention are those in which the glycol component is ethylene glycol or 1,4-cyclohexanedimethanol or a mixture of ethylene glycol and 1,4-cyclohexanedimethanol.

In another aspect of the invention, a blend wherein the dicarboxylic acid component of said polyester comprises 2,6-naphthalene dicarboxylic and terephthalic acid and the glycol component of said polyester comprises ethylene glycol and 1,4-cyclohexanedimethanol is preferred.

In yet another aspect of the invention, a blend wherein said polyester has an acid component which comprises 100 to 10 mole percent 2,6-naphthalenedicarboxylic acid and 0 to 90 mole percent of terephthalic acid, isophthalic acid, or a mixture of terephthalic and isophthalic acid is preferred.

In yet another aspect of the invention, a blend wherein said polyester has an acid component which comprises 50 to 10 mole percent 2,6-naphthalenedicarboxylic acid and 50 to 90 mole percent terephthalic acid, or a mixture of terephthalic acid and isophthalic acid is preferred.

In yet another aspect of the invention, a blend wherein the dicarboxylic acid component of said polyester consists essentially of 2,6-naphthalenedicarboxylic acid and terephthalic acid and the glycol component of said polyester consists essentially of ethylene glycol and 1,4-cyclohexanedimethanol, and wherein the amount of 2,6-dinaphthalene dicarboxylic acid in said dicarboxylic acid component is at least about 32 mole percent and the amount of 1,4-cyclohexanedimethanol in said glycol component is no more than about 65 mole percent, is preferred.

A most preferred embodiment of the composition of the invention comprises (A) about 10 to 50 weight percent of a polyetherimide and (B) about 90 to 50 weight percent of the polyester. Preferred polyesters are polyesters of 2,6-naphthalenedicarboxylic acid and ethylene glycol or copolyesters of 2,6-naphthalenedicarboxylic acid and ethylene glycol modified with terephthalic and/or isophthalic acid and with butanediol and/or 1,4-cyclohexanedimethanol.

The blends of the invention can be compounded in the melt, for example, by using a single screw or twin screw extruder. They may also be prepared by solution blending. Additional colorants, lubricants, release agents, impact modifiers, and the like can also be incorporated into the formulation during melt blending or solution blending.

The examples which follow further illustrate compositions and the method of the invention and provide comparisons with other polymer blends.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

Example 1

Polyesters and copolyester of Table 1 below were blended in equal parts by weight with a polyetherimide (PEI). The polyesters were prepared by reacting the acids, 2,6-naphthalenedicarboxylic acid (NA) or terephthalic acid (TA), or mixtures thereof, with ethylene glycol (EG) or 1,4-cyclohexanedimethanol (CG), or mixtures thereof. The polyetherimide was Ultem 1000™ polyetherimide, which is commercially available from General Electric Company. This polyetherimide is essentially the reaction product of 2,2-bis[4(3,4-dicarboxyphenoxy)phenyl] propane dianhydride:

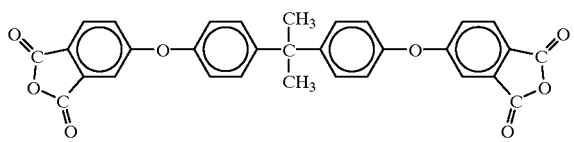

and meta-phenylenediamine.

The 50/50 by weight polyester/polyetherimide blends were prepared in a solution of 75/25 by volume methylene chloride/hexafluoroisopropanol and precipitated by dropping into methanol, with stirring. The precipitate was isolated by decanting and dried under vacuum at ≈60° C. for three days. The blends were tested by differential scanning calorimetry in order to determine the glass transition temperature (T$_g$), crystallization temperature (T$_c$), and melting temperature (T$_m$). Particular note was taken as to whether each blend exhibited one or two glass transition temperatures, intermediate between the glass transition temperatures of the polyester and polyetherimide. The blends were also melt pressed into thin films at ≈280° C. The films were inspected visually for clarity.

The results of differential scanning calorimetry and film clarity observations shown in Table 1 demonstrate the particular copolyester composition ranges over which a solid single phase blend with good clarity may be obtained. All of the pressed films exhibited a light brown color similar to that of the pure polyetherimide. Based on the observations of $T_g$s and film clarity, a map of the composition range over which a visually clear blend is obtained is illustrated in the drawings.

TABLE 1

| Sample | Mole % in Acid | | Mole % in Glycol | | Number of Tgs | Film Clarity |
| --- | --- | --- | --- | --- | --- | --- |
| | NA | TA | EG | CG | | |
| A1 | 0 | 100 | 100 | 0 | Two | Cloudy |
| B1 | 0 | 100 | 42 | 58 | Two | Cloudy |
| C1 | 0 | 100 | 28 | 72 | Two | Cloudy |
| D1 | 0 | 100 | 0 | 100 | Two | Cloudy |
| E1 | 100 | 0 | 100 | 0 | One | Clear |
| F1 | 68 | 32 | 0 | 100 | One | nd |
| G1 | 100 | 0 | 35 | 65 | One | Clear |
| H1 | 66 | 34 | 35 | 65 | One | Clear |
| I1 | 66 | 34 | 68 | 32 | One | Clear |
| J1 | 32 | 68 | 36 | 64 | One | Clear |
| K1 | 34 | 66 | 67 | 33 | One | Clear |
| L1 | 5 | 95 | 0 | 100 | Two | Cloudy |
| M1 | 10 | 90 | 0 | 100 | Two | Cloudy |
| N1 | 20 | 80 | 0 | 100 | Two | Cloudy |
| O1 | 51 | 49 | 100 | 0 | One | Clear |
| P1 | 16 | 84 | 100 | 0 | One | Clear |
| Q1 | 16 | 84 | 29 | 71 | Two | Cloudy | nd: not determined

The blends of polyetherimide with polyesters of terephthalic acid and ethylene glycol or 1,4-cyclohexanedimethanol, or mixtures thereof, formed two phase solid solutions and thus resulted in cloudy films (i.e. samples A1, B1, C1, D1), in accordance with the teachings of White et al. in U.S. Pat. No. 4,141,927. The blends with polyesters of terephthalic acid with ethylene glycol or 1,4-cyclohexanedimethanol, or mixtures thereof, which were modified by 20 mole percent or less of 2,6-naphthalenedicarboxylic acid (i.e. samples L1, M1, N1) also resulted in two phase solid solutions and cloudy films. In contrast, the blends of polyesters based on 2,6-naphthalenedicarboxylic acid with ethylene glycol and 1,4-cyclohexanedimethanol, or mixtures thereof, (i.e. samples E1, G1) surprisingly formed single phase solid solutions and clear films. The results also demonstrate that visually clear blends may still be obtained if a polyester based on 2,6-naphthalenedicarboxylic acid with ethylene glycol and 1,4-cyclohexanedimethanol, or a mixture thereof, is modified with certain amounts of terephthalic acid. This is demonstrated by samples H1, I1, J1, K1, O1 and P1. Furthermore, the results demonstrate that the amount of modifying terephthalic acid which may be used while still obtaining a visually clear blend is dependent on the particular glycol or mixture of glycols which is used. For example, the polyesters of both samples P1 and Q1 are composed of 16% 2,6-naphthalendicarboxylic acid and 84% terephthalic acid. However, sample P1 is a clear blend while sample Q1 is a cloudy blend. The difference is due to the particular glycols which are used in these samples, namely, 100 mole percent ethylene glycol in the clear blend P1 and 100 mole percent 1,4-cyclohexanedimethanol in the cloudy blend Q1.

Example 2

Blends of polyesters and the same polyetherimide described in Example 1 were compounded in the melt and injection molded. The polyesters compounded were as follows: poly(ethylene 2,6-naphthalenedicarboxylate); poly(ethylene terephthalate); poly(ethylene-cocyclohexane-1,4-dimethylene terephthalate) with 42 mole % ethylene and 58 mole % cyclohexane-1,4-dimethylene in the glycol; and poly(ethylene-co-cyclohexane-1,4-dimethylene terephthalate) with 28 mole % ethylene and 72 mole % cyclohexane-1,4-dimethylene in the glycol.

The polyester compositions along with the blend compositions and observed clarity are reported in Table 2. All of the blends exhibited a light brown color similar to that of the pure polyetherimide.

The diffuse transmittance of injection molded articles formed from several of the blends, which is a measure of the visual clarity of the articles, was determined by the procedure of ASTM D1003. The results of these measurements are included in Table 2.

TABLE 2

| Sample | Polyester Composition | | | | Weight % PEI in Blend | Visual Clarity | % Diffuse Transmittance |
| --- | --- | --- | --- | --- | --- | --- | --- |
| | Mole % in Acid | | Mole % in Glycol | | | | |
| | NA | TA | EG | CG | | | |
| A2 | 0 | 100 | 100 | 0 | 0 | Clear | |
| B2 | " | " | " | " | 10 | Cloudy | |
| C2 | " | " | " | " | 20 | Opaque | |
| D2 | " | " | " | " | 30 | Opaque | 19 |
| E2 | 0 | 100 | 42 | 58 | 0 | Clear | 80 |
| F2 | " | " | " | " | 10 | Opaque | |
| G2 | " | " | " | " | 20 | Opaque | 13 |
| H2 | " | " | " | " | 30 | Cloudy | 17 |
| I2 | 0 | 100 | 28 | 72 | 0 | Clear | 81 |
| J2 | " | " | " | " | 10 | Opaque | |
| K2 | " | " | " | " | 20 | Opaque | 11 |
| L2 | " | " | " | " | 30 | Opaque | 5 |
| M2 | 100 | 0 | 100 | 0 | 0 | Clear | |
| N2 | " | " | " | " | 10 | Clear | 51 |
| O2 | " | " | " | " | 20 | Clear | 51 |
| P2 | " | " | " | " | 30 | Clear | 46 |

Samples B2, C2, D2, F2, G2, H2, J2, K2, L2 were opaque or cloudy because they formed two phase solid solutions, as taught by White and Matthews in U.S. Pat. No. 4,141,927. However, samples N2, O2, and P2 (which are compositions of this invention) were surprisingly clear. In addition, the molded articles formed from these compositions exhibited a high percentage of diffuse light transmittance.

Example 3

Blends of poly(ethylene 2,6-naphthalenedicarboxylate) with the same polyetherimide described in Example 1 were prepared by first compounding on a co-rotating twin screw extruder and the injection molding into parts for mechanical testing. All of the blends exhibited excellent transparency and a light brown color similar to that of the pure polyetherimide. The blend compositions, processing conditions, and mechanical properties are given in Table 3. The diffuse transmittance of the articles formed from blends of the invention, measured according to ASTM D1003, are also included in Table 3.

TABLE 3

| Sample | A3 | B3 | C3 | D3 |
|---|---|---|---|---|
| PEI Weight % | 0 | 10 | 20 | 40 |
| Compounding Temp. (° C.) | 295 | 295 | 295 | 295 |
| Molding Temp. (° C.) | 300 | 305 | 305 | 305 |
| % Diffuse Transmittance*** |  | 51 | 41 | 42 |
| Appearance | Clear | Clear | Clear | Clear |
| Izod Impact Strength (ft · lb/in)**** | | | | |
| Notched 23° C. | 0.6 | 0.6 | 0.6 | |
| Notched −40° C. | 0.7 | 0.6 | 0.5 | 0.5 |
| Unnotched 23° C. | 20.1 | 21.9 | 17.0 | 26.4 |
| Unnotched −40° C. | 10.2 | 8.5 | 11.8 | 14.5 |
| Flexural Strength (psi)* | 14410 | 15600 | 16510 | 18520 |
| Flexural Modulus (kpsi)* | 347 | 370 | 377 | 411 |
| Heat Deflection Temperature (° C.)** | | | | |
| at 66 psi | 109 | 115 | 125 | 141 |
| at 264 psi | 88 | 98 | 110 | 125 |

*measured according to ASTM D790
**measured according to ASTM D648
***measured according to ASTM D1003
****measured according to ASTM D256

Some of the advantages of these blends are demonstrated by these results. The flexural strength, flexural modulus, and heat deflection temperatures increase with the addition of the polyetherimide to the polyester. In addition, the blends can be processed at a much lower temperature than that which is required when processing the pure polyetherimide, and the molded articles exhibit high diffusive transmittance. Because of these properties of the novel polymeric blends, they can be molded at reasonably low temperatures to form articles which are resistant to deformation at elevated temperatures. For example, molded articles of the novel polymeric blends can be used as containers that can withstand heat such as cooking vessels or as polymeric parts positioned near motors in golf carts, lawnmowers and the like. In all of these uses the optical clarity and the resistance to thermal deformation are valuable properties of the novel polymer blends of the invention.

The invention has been described in detail with particular reference to preferred embodiments thereof, but it will be understood that variations and modifications can be effected within the spirit and scope of the invention.

I claim:

1. A visually clear blend of thermoplastic polymers comprising a polyetherimide and a polyester of (a) an acid component comprising 2,6-naphthalene dicarboxylic acid and (b) a glycol component comprising at least one glycol selected from the group consisting of ethylene glycol, 1,3-trimethylene glycol, 1,4-butanediol, 1,5-pentanediol, 1,6-hexanediol, 1,7-heptanediol, neopentyl glycol, 1,4-cyclohexanedimethanol and diethylene glycol, wherein the amount of said 2,6-naphthalene dicarboxylic acid in the acid component is greater than about 30 mol % when 1,4-cyclohexane-dimethanol is present in said glycol component.

2. A blend according to claim 1 wherein the glycol component of said polyester comprises at least about 35 mole percent ethylene glycol.

3. A visually clear blend of thermoplastic polymers comprising (A) about 1 to 99 weight percent of a polyetherimide having recurring units of the formula:

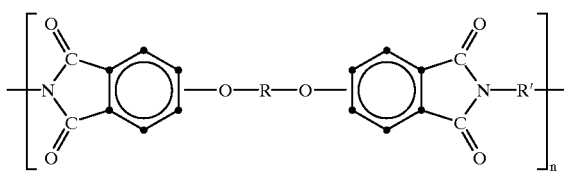

where n is a whole number greater than 1, the radical —O—R—O is in the 3- or 4- and 3'- or 4'- positions and R is selected from the group consisting of

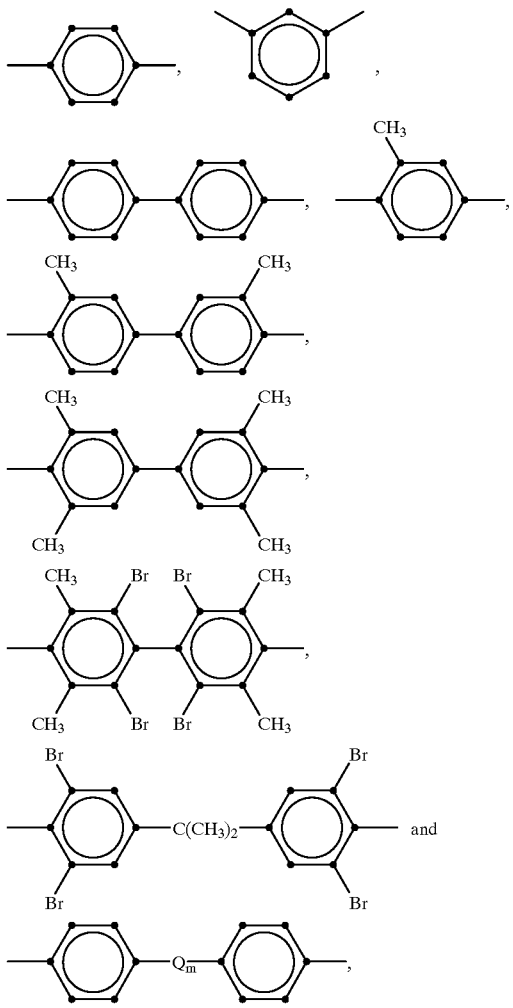

where m is 0 or 1 and Q is

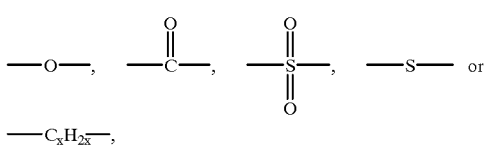

and x is a whole number from 1 to 5, inclusive,
the radical —R'— is a divalent organic radical selected from the class consisting of:
(1) aromatic hydrocarbon radicals having from 6 to 20 carbon atoms and halogenated derivatives thereof;

(2) alkylene radicals and cycloalkylene radicals having from 2 to 20 carbon atoms; and
(3) radicals of the formula:

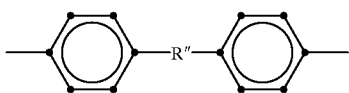

where R″ is

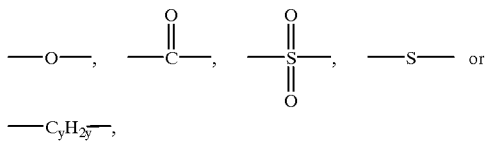

and y is a whole number from 1 to 5, inclusive, (B) about 99 to 1 weight percent of a polyester of a dicarboxylic acid component comprising 2,6-naphthalene dicarboxylic acid and of a glycol component comprising at least one glycol selected from the group consisting of aliphatic or cycloaliphatic glycols having about 2 to 15 carbon atoms, wherein said weight percents are based upon all components present in said blend.

4. The blend according to claim 3 wherein said glycol component is selected from the group consisting of ethylene glycol, 1,3-trimethylene glycol, 1,4-butanediol, 1,5-pentanddiol, 1,6-hexanediol, 1,7-heptanediol, neopentyl glycol, 1,4-cyclohexanedimethanol and diethylene glycol.

5. A blend according to claim 3 wherein the dicarboxylic acid component of said polyester further comprises terephthalic acid, isophthalic acid, phthalic acid, 4,4-stilbenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid or trans-1,4-cyclohexanedicarboxylic acid.

6. A blend according to claim 5 wherein the dicarboxylic acid component of said polyester comprises 2,6-naphthalene dicarboxylic acid and terephthalic acid and the glycol component of said polyester comprises ethylene glycol and 1,4-cyclohexanedimethanol.

7. A blend according to claim 6 wherein the dicarboxylic acid component of said polyester consists essentially of 2,6-naphthalene dicarboxylic acid and terephthalic acid and the glycol component of said polyester consists essentially of ethylene glycol and 1,4-cyclohexanedimethanol and wherein the amount of 2,6-naphthalene dicarboxylic acid in said dicarboxylic acid component is at least about 32 mole percent and the amount of 1,4-cyclohexanedimethanol in said glycol component is no more than about 65 mole percent.

8. A molded article formed from the blend according to claim 7 wherein said article has a flexural modulus of at least about 377 kpsi and a heat deflection temperature at 264 psi of at least about 110° C.

9. A molded article formed of the blend according to claim 7, said blend containing at least about 40 weight percent polyetherimide and said article having a flexural modulus greater than about 400 kpsi and a heat deflection temperature at 264 psi of at least about 125° C.

10. A blend according to claim 3 wherein the glycol component of said polyester comprising 1,8-octanediol, 1,9-nonanediol, 1,10-decanediol, 1,12-dodecanediol or 2,2,4,4-tetramethyl-1,3-cyclobutanediol.

11. A blend according to claim 3 wherein the radical —R— is a member of the group comprising of:

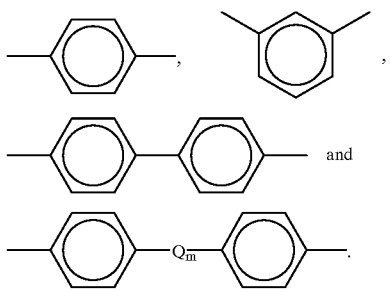

where Q is a divalent radical of the formula

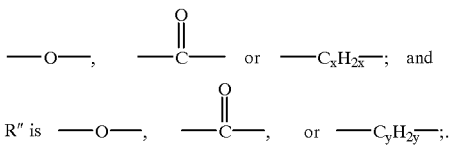

R″ is —O—, $-\overset{O}{\underset{\|}{C}}-$, or —$C_yH_{2y}$—;.

12. A blend according to claim 11 where —R— is

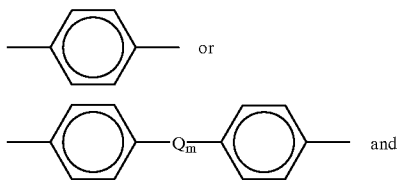

Q is a divalent radical of the formula —$C_xH_{2x}$—, and R″ is a divalent radical of the formula —$C_yH_{2y}$—.

13. A blend according to claim 12 where —R— is

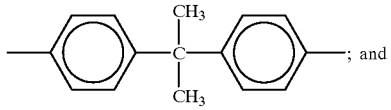

—R′— is a divalent organic radical selected from the class consisting of: (1) aromatic hydrocarbon radicals having from 6 to 10 carbon atoms; and (2) alkylene radicals and cycloalkylene radicals having from 2 to 10 carbon atoms; and the glycol component comprises at least one glycol selected from the group consisting of ethylene glycol, 1,4-butanediol, 1,6-hexanediol, 1,4-cyclohexanedimethanol and diethyleneglycol.

14. A blend according to claim 13 in which the glycol component is ethylene glycol or 1,4-cyclohexanedimethanol or a mixture of ethylene glycol and 1,4-cyclohexanedimethanol.

15. A blend according to claim 14 where R′ of the polyetherimide is

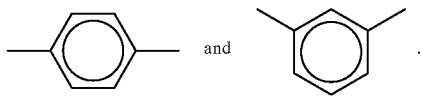

16. A blend according to claim 15 comprising about 10 to 50 weight percent polyetherimide and from about 90 to 50 weight percent polyester.

17. A blend according to claim 15 wherein said polyester has an acid component which comprises 100 to 10 mole percent 2,6-naphthalenedicarboxylic acid and 0 to 90 mole percent of terephthalic acid, isophthalic acid or a mixture of terephthalic acid and isophthalic acid.

18. A blend according to claim 15 wherein said polyester has an acid component which comprises 50 to 10 mole percent 2,6-naphthalenedicarboxylic acid and 50 to 90 mole percent terephthalic acid, isophthalic acid or a mixture of terephthalic acid and isophthalic acid.

19. A molded article formed from the blend according to claim 3 wherein said article has a diffuse transmittance of at least about 40 percent when tested in accordance with ASTM D1003.

20. A method for increasing the heat deflection temperature of a thermoplastic polyester composition comprising a polyester of 2,6-naphthalenedicarboxylic acid which comprises melt blending with said polyester a polyetherimide having recurring units of the formula

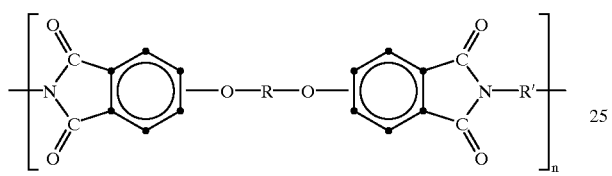

where n is a whole number greater than 1, wherein —R— is (1)

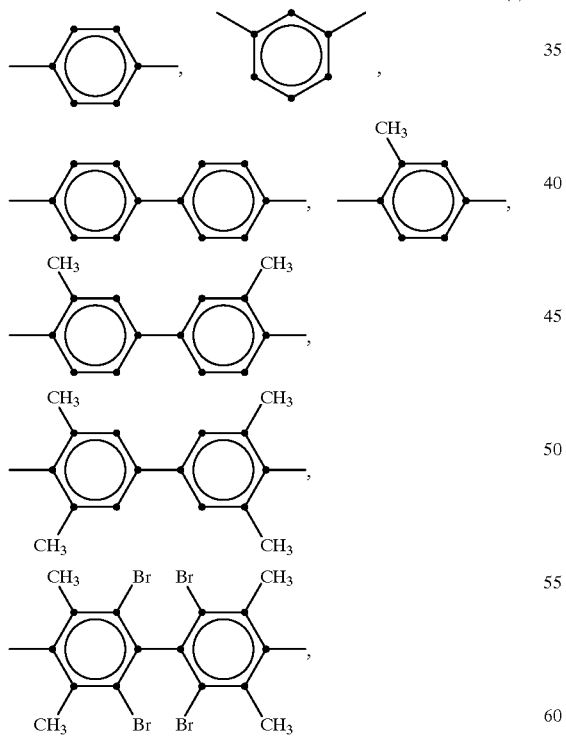

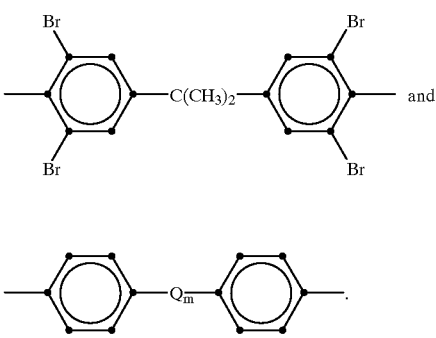

and

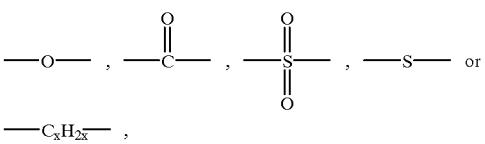

where m is 0 or 1 and Q is

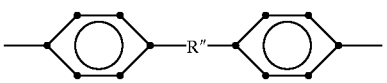

$-C_xH_{2x}-$ , where x is a whole number from 1 to 5, inclusive; and —R'— is a divalent organic radical selected from the group consisting of:
(1) aromatic hydrocarbon radicals having from 6 to 20 carbon atoms and halogenated derivatives thereof;
(2) alkylene radicals and cycloalkylene radicals having from 2 to 20 carbon atoms; and
(3) radicals of the formula:

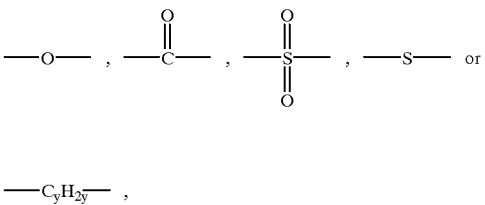

where R" is

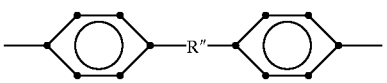

$-C_yH_{2y}-$ , where y is a whole number from 1 to 5, inclusive, in an amount sufficient to form a single phase solid solution which is clear and transparent and of higher heat deflection temperature than said polyester.

* * * * *